United States Patent [19]

Tomlinson et al.

[11] 4,353,482

[45] Oct. 12, 1982

[54] ADDITIVE METERING CONTROL SYSTEM

[75] Inventors: Harvard L. Tomlinson; Stephen F. Crain, both of Duncan, Okla.

[73] Assignee: Halliburton Company, Duncan, Okla.

[21] Appl. No.: 114,615

[22] Filed: Jan. 23, 1980

[51] Int. Cl.³ .................... B67B 7/00; G05D 11/02
[52] U.S. Cl. .................................... 222/1; 222/55; 222/57; 364/479; 366/152
[58] Field of Search ............... 222/1, 52, 55, 56, 57; 137/3, 9, 101.21; 364/478, 479; 366/151, 152, 160

[56] References Cited

U.S. PATENT DOCUMENTS

| Re. 18,063 | 5/1931 | Steinhauer . | |
|---|---|---|---|
| 2,024,478 | 12/1935 | Short . | |
| 2,658,644 | 11/1953 | Lowe | 222/55 X |
| 2,704,173 | 3/1955 | Edwards . | |
| 2,873,036 | 2/1959 | Noble . | |
| 3,027,099 | 3/1962 | Ludwig . | |
| 3,041,049 | 6/1962 | Tarukawa . | |
| 3,053,577 | 9/1962 | Ungashick . | |
| 3,115,278 | 12/1963 | Mylting . | |
| 3,181,482 | 5/1965 | Heth et al. . | |
| 3,219,046 | 11/1965 | Waugh . | |
| 3,245,584 | 4/1966 | Linville . | |
| 3,270,921 | 9/1966 | Nadolske et al. . | |
| 3,329,313 | 7/1967 | Mayer . | |
| 3,410,293 | 11/1968 | Ernyei | 137/9 X |
| 3,452,774 | 7/1969 | Stanton | 222/56 X |
| 3,475,392 | 10/1969 | McCoy et al. | 137/3 X |
| 3,481,544 | 12/1969 | Jackson . | |
| 3,536,235 | 10/1970 | Holzhauer et al. . | |
| 3,558,017 | 1/1971 | Soojian et al. . | |
| 3,605,775 | 9/1971 | Zaander et al. | 137/3 |
| 3,606,903 | 9/1971 | Porter et al. | 137/9 X |
| 3,609,316 | 9/1971 | Brosset et al. | 364/479 |
| 3,721,253 | 3/1973 | Remke | 137/3 |
| 3,822,809 | 7/1974 | Foucault et al. . | |
| 3,843,099 | 10/1974 | Duncan | 366/152 X |
| 4,209,258 | 6/1980 | Oakes | 366/152 X |

FOREIGN PATENT DOCUMENTS

| 637629 | 3/1962 | Canada . | |
|---|---|---|---|
| 667957 | 6/1979 | U.S.S.R. | 137/101.21 |

*Primary Examiner*—Robert B. Reeves
*Assistant Examiner*—Edward M. Wacyra
*Attorney, Agent, or Firm*—John H. Tregoning; Joseph A. Walkowski, Jr.; E. Harrison Gilbert, III

[57] ABSTRACT

An apparatus for controlling the metering of additives which are to be blended with a primary substance includes an element which determines how much additive is being discharged from an additive storage container. This element includes a weight detecting device which detects a first portion of the additive contained in a metering container and includes another weight detecting device for detecting the weight of a second portion of the additive contained in an inventory container which feeds the additive into the metering container. This element also includes a volumetric flow rate monitoring device for monitoring the flow rate of a liquid additive. Each of these detecting and monitoring devices generates respective electrical signals proportional to the respective monitored conditions. The apparatus also includes an element for sensing how much of the primary substance is being discharged from a primary substance container. This element includes both a main flowmeter which detects the actual rate of flow and a device for simulating a flow rate. Proportional electrical signals are generated by the flow meter and the flow rate simulating device. The apparatus also includes a control circuit which uses the electrical signals to control the amount of additive which is discharged and added to the primary substance. This determination is made based on data which is entered into the apparatus by means of manually actuated switches and keys. Control signals are generated by a microprocessor and associated program.

37 Claims, 11 Drawing Figures

ADDITIVE METERING CONTROL SYSTEM

This invention relates generally to apparatus for controlling the amount of an additive which is to be blended with another substance and more particularly, but not by way of limitation, to apparatus for continuously automatically metering the additive in response to the rates of discharge of both the additive and the substance with which the additive is to be blended or has been blended.

In the blending of materials it is important to control the proportions between the blended substances so that the resultant blend has the desired concentrations of substances. In the oil industry, for example, blended substances, such as fracturing fluids, having the proper concentrations of constituents must often be pumped downhole to perform various functions, such as fracturing the formations to enhance the recovery of the oil and/or gas located there. These blended fracturing compositions contain blends of additives which include both liquid and dry substances and which must be mixed properly to obtain an effective fracturing composition. This example shows that there is the need for an apparatus which achieves a proper blending of liquid and dry additives with a primary substance.

For such an apparatus to achieve the proper blend, the amount of the additive discharged from the additive storage container and the amount of the primary substance to which the additive is to be mixed (or the amount of the total mixture thereof) discharged from its storage container must be known. Therefore, there is the need for such an apparatus to have an additive metering control system which monitors both of these discharges to control the amount of additive blended with the primary substance.

Furthermore, it is often necessary in blending materials to perform the blending in a field environment for extended periods. In the oil industry it is necessary at times to prepare mixtures of substances and to pump them downhole for extended periods of time. For example, blended fracturing mixtures are, at times, needed for several hours. This requires tons of chemicals to be continually blended. It is apparent that such a task cannot be performed accurately by manual labor alone. Therefore, there is also the need for the control system to continuously and automatically control the metering of the additives.

The general need for a substance metering system has been previously recognized as evidenced by the disclosures in U.S. Pat. Nos. 4,112,272 in the name of Ricciardi et al., 4,111,335 in the name of Arya et al. and 4,111,336 in the name of Ward et al. For example, the Ricciardi et al. patent discloses a weigh feeding apparatus which controls the amount of a substance being discharged by determining the weight of the discharged substance and then comparing this detected weight with input data signals as provided by a plurality of switch means connected to the microcomputer which constitutes the main controlling element of the disclosed apparatus.

However, it will be noted that the Ricciardi et al. patent and the other references cited above fail to disclose a metering system which is responsive to both the discharge rate of the additive and the flow rate of the primary substance to which the additive is, or has been, added. We also believe that these references fail to disclose means for simulating a flow rate for the primary substance. In general, we believe these references have the shortcoming of failing to propose a versatile metering system capable of relatively easy, maintenance-free, in-field control of the discharge rates of a plurality of liquid and dry additives.

The present invention overcomes the above-noted and other shortcomings of the prior art by providing a novel, useful and non-obvious additive metering control system. The present invention provides a metering control system which is responsive to both the discharge of the additive and the discharge of the primary substance to which the additive is to be added (or the discharge of the resultant blended substance, from which the discharge of the primary substance can be determined). This metering system includes means for simulating the flow rate of the primary substance (or blended substance) and generally provides relatively easy, maintenance-free, in-field control of a plurality of liquid and dry additives.

Broadly, the present invention includes means for determining the amount of additive being discharged from an additive container, means for sensing the amount of primary substance being discharged from a primary substance container, and means, responsive to both the additive substance determining means and the primary substance sensing means, for controlling the amount of additive being discharged from the additive container.

In one embodiment the additive determining means includes means for detecting the weight of a first portion of the additive and for generating a first electrical signal proportional to the detected weight. In a second embodiment the additive determining means includes means for monitoring the volumetric flow rate of the additive and for generating an electrical signal proportional to the monitored flow rate. Each of these electrical signals is used by the controlling means, which in the preferred embodiment includes a microprocessor.

The primary substance sensing means includes means for generating an electrical signal proportional to the flow rate of the sensed primary substance. This primary substance may be either the unblended substance to which the additive is to be combined or it may be the blended fluid obtained after the blending has occurred. Regardless of which substance the sensing means detects, the generated proportional electrical signal is provided to the controlling means for use thereby, along with the electrical signal obtained from the additive determining means, for controlling the subsequent amount of additive discharged from its container.

The primary substance sensing means further includes means for simulating a flow rate of the primary substance and for generating a second electrical signal proportional to the simulated flow rate. Also included is means for switchably communicating the first electrical signal generating means and the simulating and generating means with the controlling means. In this way either the actual primary substance flow rate or a simulated flow rate is entered and used by the controlling means for controlling the amount of the additive discharged into the substance with which it is to be blended.

The controlling means includes means for comparing the actual amount of additive substance discharged with a predetermined reference level, such as the required amount to be discharged as calculated from the actual or simulated flow rates of the primary substance. The controlling means further includes means, responsive to the comparing means, for creating an error signal when the discharged amounts do not favorably compare with the predetermined reference value. The controlling means further comprises an input and readout means.

Therefore, from the foregoing it is a general object of the present invention to provide a novel, useful and nonobvious additive metering control system. Other and further objects, features and advantages of the present invention will be readily apparent to those skilled in the art when the description of the preferred embodiment which follows is read in conjunction with the accompanying drawings.

Figure 1:
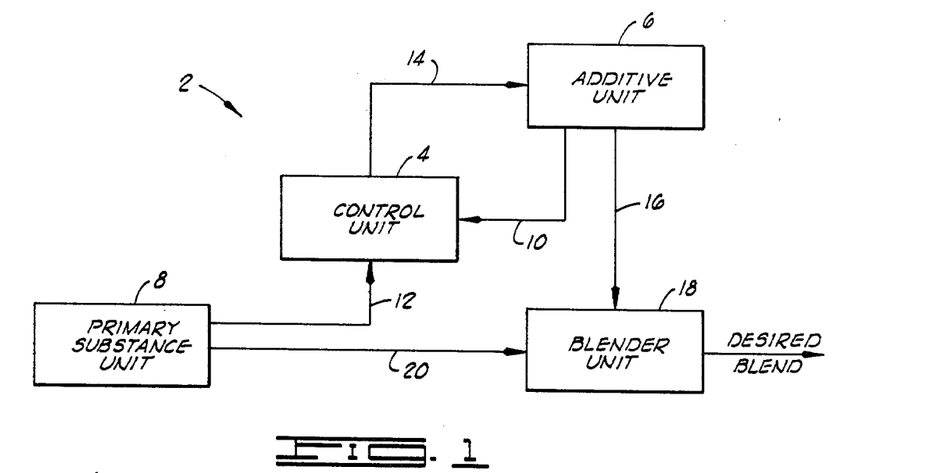
FIG. 1 is a general functional block diagram of the present invention.

With reference now to the drawings and in particular to FIG. 1, a preferred embodiment of the present invention will be described. FIG. 1 discloses that the present invention, generally referred to by the reference numeral 2, includes a control unit 4 which is responsive to an additive unit 6, having means for determining the amount of an additive being discharged therefrom, and a primary substance unit 8, having means for sensing the amount of a primary substance being discharged therefrom, as depicted by the arrows 10 and 12, respectively. In response to inputs from the additive unit 6 and the primary unit 8, the control unit 4 controls the amount of the additive being discharged from the additive unit. The control is represented by the arrow 14 and the additive unit discharge is represented by the arrow 16.

The amount of additive which is discharged from the additive unit 6 is blended in a blender unit 18 with the primary substance which is discharged from the primary substance unit 8 as represented by the arrow 20. Upon blending in the blender unit 18, the desired blended substance is obtained therefrom.

It is to be noted that the FIG. 1 embodiment discloses the control unit 4 is responsive to input received from the primary substance unit prior to the primary substance being blended with the additive; however, the control unit 4 can also function when the input received from the primary substance unit 8 corresponds to the status of the final blended substance. For purposes of simplifying the following description, it will be assumed that the control unit 4 monitors the primary substance prior to its entry into the blender unit 18.

Figure 2:
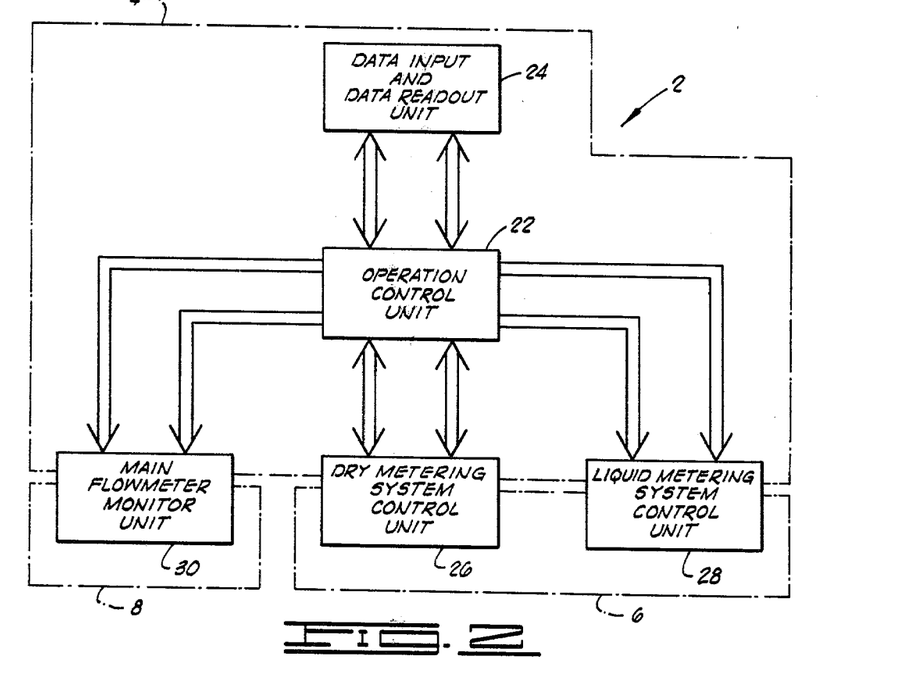
FIG. 2 is a functional block diagram of a preferred embodiment of the present invention.

FIG. 2 shows the control unit 4 more particularly includes an operation control unit 22 and a data input and data readout unit 24, as well as a portion of each of a dry metering system control unit 26, a liquid metering system control unit 28, and a main flowmeter monitor unit 30. Also in the particular embodiment of FIG. 2 it is shown that the additive unit 6 includes another part of the dry metering system control unit 26 and the liquid metering system control unit 28. FIG. 2 further discloses that the primary substance unit 8 more particularly includes a portion of the main flowmeter monitor unit 30.

Figure 3:
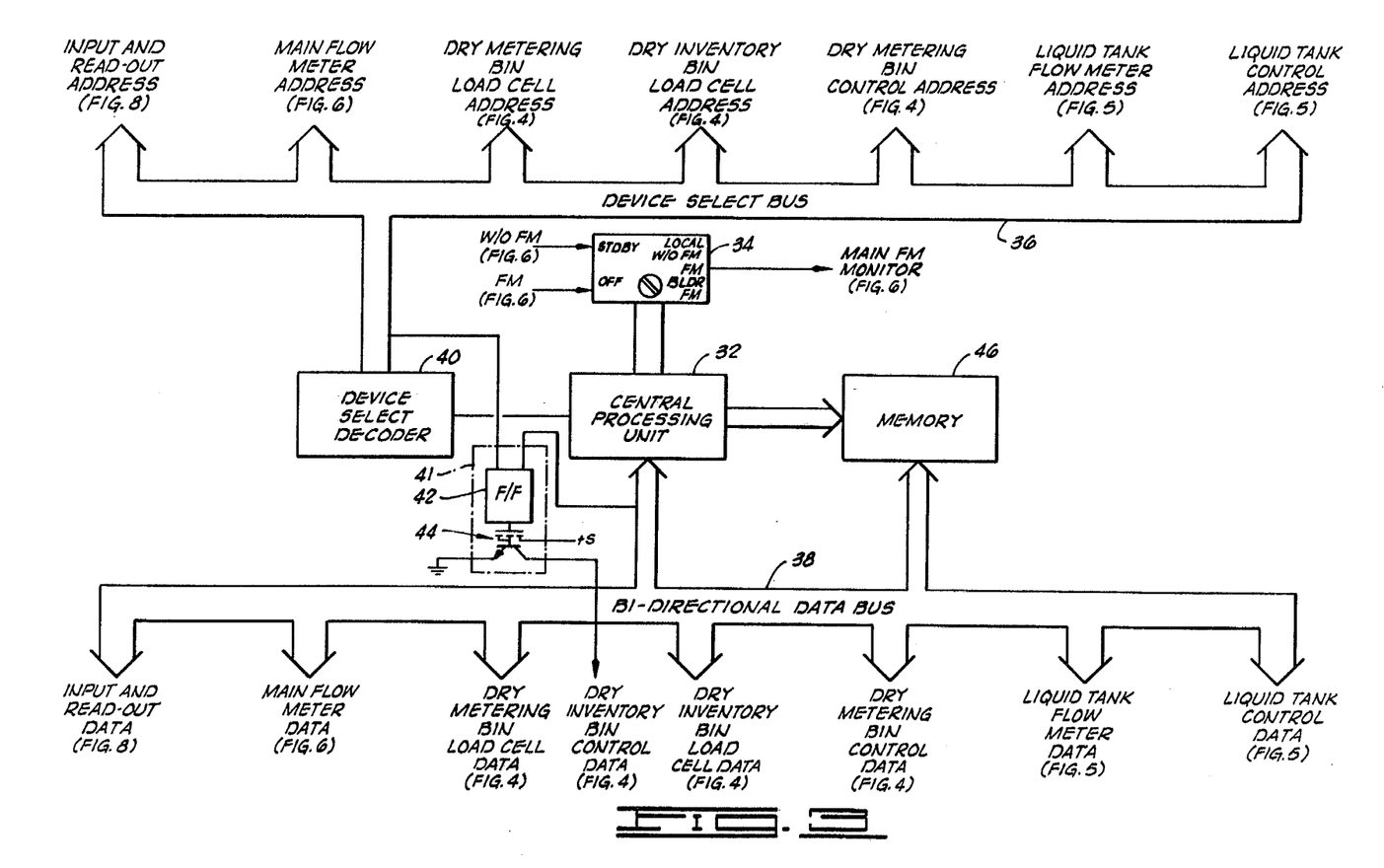
FIG. 3 is a functional block diagram of the operation control unit of the FIG. 2 embodiment.

With reference to FIGS. 3–9C a more detailed description of the elements of the FIG. 2 embodiment will be presented. FIG. 3 discloses that the operation control unit 22 of the controlling means 4 includes a central processing unit 32. This central processing unit provides means for comparing the actual amount of discharged additive with a predetermined reference value and means, responsive to the comparing means, for creating an error signal when the actual discharged amount does not favorably compare with the predetermined reference value. In the preferred embodiment the comparing means and the error signal creating means are implemented with a microprocessor and an associated, program-containing memory of suitable types as are known in the art. In the preferred embodiment the microprocessor is an eight-bit type and the memory includes both ROM and RAM components.

FIG. 3 shows that the central processing unit 32 is connected to a mode selection switch 34 for selecting, in the preferred embodiment, any one of four modes. As shown in FIG. 3 these modes include off (OFF), standby (STDBY), local (LOCAL), and blender flowmeter (BLDR FM) and are entered in the central processing unit 32 over two input lines. The local mode may operate either with or without the main flowmeter as will be described further hereinbelow. Each of these modes will be discussed further hereinbelow with reference to the operation of the present invention.

Also associated with the central processing unit are a device select, or address, bus 36 and a bi-directional data bus 38. The address bus 36 is driven by a device select decoder means 40 which is controlled by the central processing unit 32. The buses 36 and 38 provide the controlling means 4 with means for accessing and acquiring information from the elements to which the buses are connected as subsequently described. For the preferred embodiment eight-bit microprocessor of the present invention, the address bus 36 and the data bus 38 each includes eight separate lines.

Connected to a respective one of the address lines of the address bus 36 and to a respective one of the data lines of the data bus 38 is a dry additive inventory bin valve switching means 41 comprising a logic gate 42 and control and power transistors 44 and having a function as subsequently described. In the preferred embodiment the logic gate 42 is a flip flop and the transistors 44 include both a VMOSFET control transistor driven by the flip flop and a bipolar power transistor driven by the VMOSFET.

FIG. 3 shows that the address bus 36 and the data bus 38 provide other address and data information as will be subsequently described. Although this various address and data information is shown in FIG. 3 to go to only one dry additive inventory bin, one dry additive metering bin and one liquid additive tank, the present invention can control a plurality of such dry additive inventory and metering bins and liquid additive tanks. That is, with reference again to FIG. 2, the operation control unit 22 as shown therein can communicate with a plurality of dry metering system control units 26 and a plurality of liquid metering system control units 28. Only single ones of these units have been shown primarily for purposes of simplicity of explanation.

FIG. 3 further discloses that the controlling means 4 includes memory means 46, including ROM and RAM components as previously mentioned, with which the central processing unit 32 communicates over the data bus 38.

Figure 4:
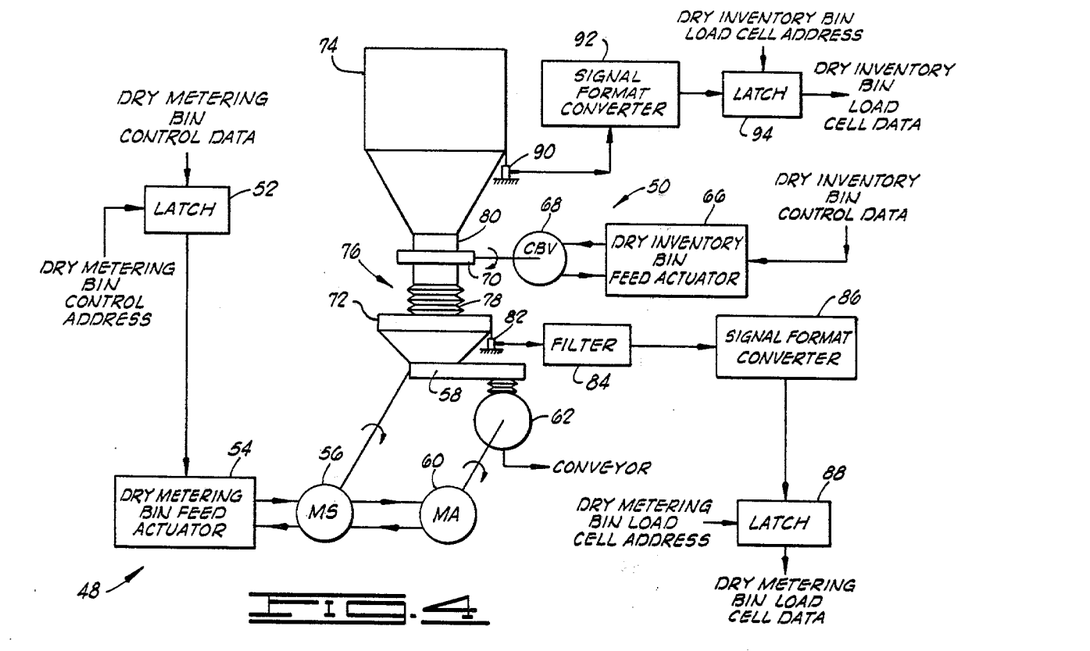
FIG. 4 is a schematic and functional block diagram of the dry metering system control unit of the FIG. 2 embodiment.

The controlling means 4 further includes means 48 for discharging the dry additive from a dry additive metering container and means 50 for releasing the dry additive from a dry additive inventory container, which means forms a part of the dry additive control system unit 26 shown in FIG. 4. The controlling means also includes means 51 for discharging the liquid additive from a liquid additive container, which means forms a part of the liquid additive control system unit 28 shown in FIG. 5.

FIG. 4 shows the means 48 for discharging the dry additive from a dry additive metering container includes a logic circuit latch means 52 which stores, under control of the dry metering bin control address sent over the address bus 36, the dry metering bin control data sent over the data bus 38 by the central processing unit 32. The latch 52 output is connected to the input of a dry metering bin feed actuator means 54 which includes a proportional control valve connected within a hydraulic system. The actuator means 54 is associated with a hydraulic motor 56 to vary the speed thereof in response to the latch 52 data for controlling the rotation of a dry additive conveyance means 58, such as a screw conveyor. This control of the conveyance means provides control of the rate that the dry additive is discharged. The dry metering bin feed actuator means 54 also controls the operation of a motor 60 which drives an air lock 62 used in further moving the discharged additive.

The releasing means 50 of the controlling means 4 is shown in FIG. 4 to include a dry inventory bin feed actuator means 66, such as a hydraulic control valve, which controls the hydraulic fluid flow to a hydraulic cylinder 68 and thereby controls the operation of a shut-off valve 70. The dry inventory bin feed actuator 66 responds to a control signal provided by the inventory bin valve switching means 41 shown in FIG. 3.

In addition to disclosing the discharging means and releasing means of the controlling means 4, FIG. 4 shows a schematic and functional block diagram of the additive unit 6 dry additive determining means portion of the dry additive metering system control unit 26. FIG. 4 schematically shows that a first portion of the dry additive to be metered is contained within a dry additive metering container 72 and that a second portion of the dry additive is contained within a larger dry additive inventory container 74 which is coupled to the metering bin 72 through a coupling means 76, such as a flexible sleeve 78 and a rigid sleeve 80 having the shut-off valve 70 located therein.

So that the amount of additive discharged from the metering container 72 by means of the discharging means 48 can be determined, the dry metering system control unit 26 includes means for detecting the weight of the first portion of the additive and for generating an electrical signal proportional to the detected weight. This detecting means is identified by the reference numeral 82 in FIG. 4 and is preferably a hydraulic load cell means associated with the metering container 72 for detecting the weight of the metering container and the dry additive contained therein. When the hydraulic load cell 82 is fully loaded with the weight of the container and its contents, it generates a proportional electrical signal which is coupled to a filter means 84. This filter filters a predetermined range of frequencies from the generated proportional electrical signal to remove unwanted noise such as arises from mechanical vibrations within the structure holding the additive containers. For example, when the control system of the present invention is used with apparatus as disclosed in the copending patent application Ser. No. 114,628 filed Jan. 23, 1980 and entitled "Additive Material Metering System" of Gerald C. Kierbow and Herbert J. Horinek, filed concurrently herewith and assigned to the assignee of the present invention, several tens or hundreds of pounds of mechanical vibration can arise and cause unwanted noise in the electrical signal representing the weight of the additive and its container. Clearly, such noise would cause spurious weight computations by the controlling means 4, so the noise must be filtered by the filter means 84. Although the load cell 82 is preferably a hydraulic type to damp these mechanical vibrations, the damping achieved thereby is inadequate so that the filter 84 becomes necessary.

FIG. 4 next shows that the filtered signal is applied to a means 86 for converting the filtered electrical signal into a digitally-coded format. This digitally-coded signal is then transferred to means 88 for retaining the signal for acquisition by the controlling means. In particular, the retaining means 88 is a logic circuit latch which loads the digitally-coded signal therein under control of a time-base means, such as a quartz crystal clock, which forms a part of the controlling means 4. The stored information is retrieved by the central processing unit 32 when the central processing unit sends the dry metering bin load cell latch address along the address bus 36. Upon activation of the latch 88, the digitally-coded data is present for acquisition by the central processing unit 32 over the data bus 38. Thus, the latch 88 is a memory means for storing the digitally-coded signal.

FIG. 4 also shows that the dry additive determining means of the additive unit 6 includes means for sensing the weight of the dry additive inventory container 74 and the dry additive contained therein and for generating an electrical signal proportional to this sensed weight. In the preferred embodiment this sensing means is an electronic load cell 90 which generates an electrical signal when loaded with the weight of the container 74 and its contents. This electrical signal is connected to means for converting it into a digitally-coded format, which converting means is identified in FIG. 4 by the reference numeral 92. This converted signal is latched into a memory means 94 for retaining the digitally-coded signal for acquisition by the controlling means over the data bus 38. As with the retaining means 88, the memory means 94 is a logic circuit latch means loadable under control of the time-base means and accessible over the address bus 36 and the data bus 38.

Figure 5:
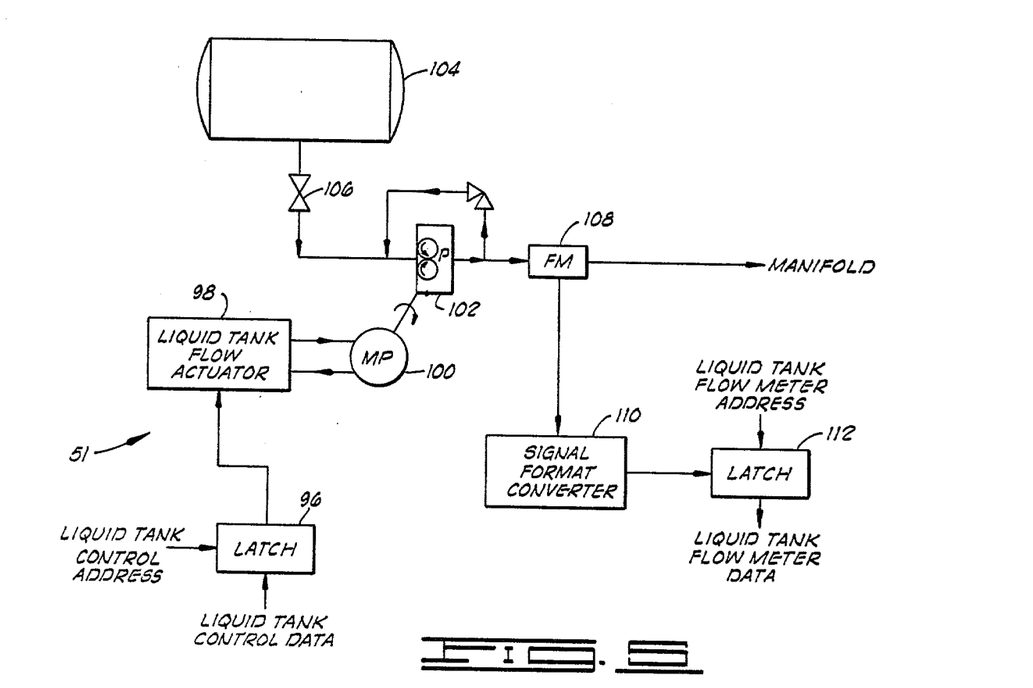
FIG. 5 is a schematic and functional block diagram of the liquid metering system control unit of the FIG. 2 embodiment.

FIG. 5 discloses that the means 51 for discharging the liquid additive from a liquid additive container includes a latch means 96 for storing the liquid tank control data transmitted to it over the data bus 38 by the central processing unit 32. The latch means 96 is connected to a liquid tank flow actuator means 98 having a proportional control valve and appropriate hydraulic apparatus for controlling a hydraulic pump motor 100 which drives a positive displacement pump 102. By varying the speed of the motor 100 via control signals from the central processing unit 32, the speed of the pump 102, and thus the rate of the additive pumped therethrough, are controlled.

FIG. 5 further shows the preferred embodiment of the portion of the liquid metering system control unit 28 forming a part of the additive discharge determining means of the additive unit 6. This portion of the unit 28 is shown to include a liquid additive container 104 from which the liquid additive is discharged through a valve 106 under force from the pumping action of the pump 102. The liquid is pumped through a means for monitoring the volumetric flow rate of the additive substance and for generating an electrical signal proportional to the monitored flow rate. In FIG. 5 this monitoring means is shown to be a flowmeter 108. The output of the flowmeter 108 is connected to means 110 for converting the electrical signal into a digitally-coded format. As with the previous digitally-coded signals, this converted signal is stored in memory means, such as a logic circuit latch 112, for acquisition by the central processing unit 32 over the data bus 38.

Figure 6:
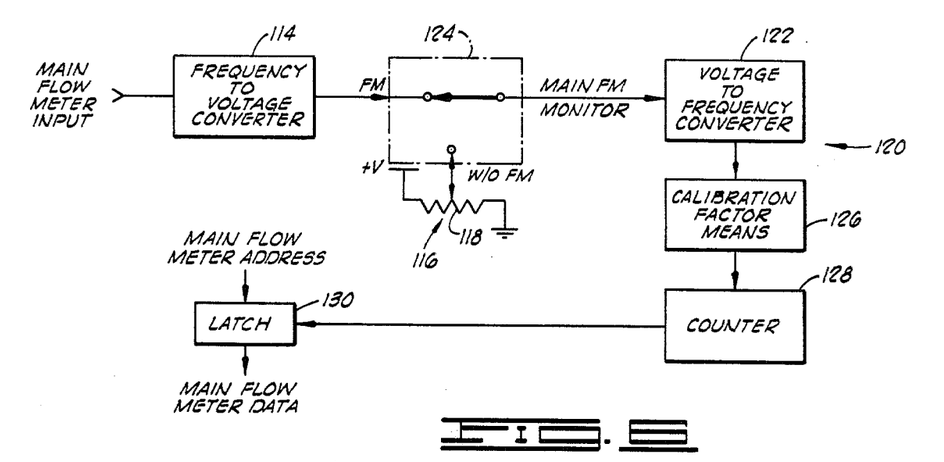
FIG. 6 is a schematic and functional block diagram of the main flowmeter monitor unit of the FIG. 2 embodiment.

FIG. 6 shows a preferred embodiment of the main flowmeter monitor unit 30 which constitutes the primary substance discharge sensing means of the primary substance unit 8. The main flowmeter input referred to in FIG. 6 is received from a main flowmeter which is located within the discharge line of the primary substance unit 8 as functionally indicated in FIG. 1. This main flowmeter provides means for generating an electrical signal proportional to the flow rate of the sensed primary substance as it flows from the primary substance unit 8. This electrical signal is converted into a proportional voltage level by a frequency-to-voltage converter means 114.

More particularly, the frequency-to-voltage converter means 114 includes an amplify-and-square circuit of the type known in the art. The input of the amplify-and-square circuit is connected to the alternating electrical signal which is generated by the main flowmeter, and the alternating output of the circuit is applied to a phase-locked loop which effectively multiplies the frequency of the output signal by ten. This increased-frequency signal is then input into a frequency-to-voltage converter circuit to convert the alternating electrical signal into a corresponding voltage level.

FIG. 6 also shows that the primary substance sensing means includes means for simulating a flow rate of the primary substance and for generating an electrical signal proportional to the simulated flow rate. This simulating and generating means is identified by the reference numeral 116 in FIG. 6 and is particularly shown to include a potentiometer 118.

The primary substance sensing means also includes means for switchably communicating the electrical signal from the converter means 114 representing the actual flow rate of the sensed primary substance and the electrical signal from the simulating and generating means 116 with the operation control unit 22 of the controlling means 4. This switchable communicating means is generally referred to by the reference numeral 120 in FIG. 6. The switchable communicating means 120 includes means 122 for converting a voltage level into an alternating electrical signal having a frequency corresponding to the input voltage level. The communicating means 120 further includes switch means 124 for selectably coupling the voltage level from the frequency-to-voltage converting means 114 and the voltage level from the simulating means 116 to the voltage-to-frequency converting means 122. In FIG. 6, the switch 124 has a first terminal connected to the output of the frequency-to-voltage converter 114 and a second terminal connected to the wiper arm of the potentiometer 118. The preferred embodiment of the switchable communicating means 120 further includes means 126 for calibrating the frequency of the alternating electrical signal output from the converting means 122. FIG. 6 shows that the output of the calibration means 126 is coupled to a logic circuit counter means 128 providing output which is latched into a storage means 130, such as a logic circuit latch, for acquisition by the central processing unit 32 over the data bus 38.

In the preferred embodiment the calibration means 126 is a logic circuit divide-by-N counter. The counter has thumbwheel switches connected to appropriate inputs thereof as known in the art so that the calibration factor by which the frequency of the alternating signal from the voltage-to-frequency converting means 122 is to be divided may be input. Once the calibration factor has been set and the frequency divided, the output of the counter is provided to the counter means 128 for generating a count which is then latched into the storage means 130.

Figure 7:
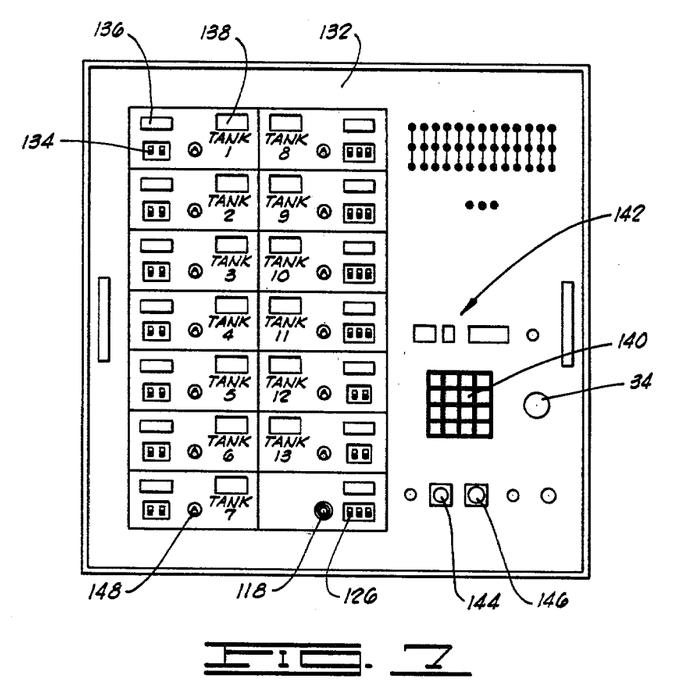
FIG. 7 is an illustration of the input and readout panel of the data input and data readout unit of the FIG. 2 embodiment.

FIG. 7 is an illustration of an input and display panel 132 of the data input and data readout unit 24 of the present invention. It is through this panel that manual commands may be made to the operation control unit 22. As will be noted, the panel disclosed in FIG. 7 indicates that thirteen tanks, or dry and/or liquid containers, are in the metering control system and thus are controlled by the operational control unit 22. In the FIG. 7 embodiment there are seven liquid additives (TANKS 1-7) and six dry additives (TANKS 8-13) which can be metered. With this number of additives to be metered, the FIG. 2 embodiment would contain seven liquid metering system control units 28 and six dry metering system control units 26 to effect the embodiment depicted in FIG. 7.

Figure 8:
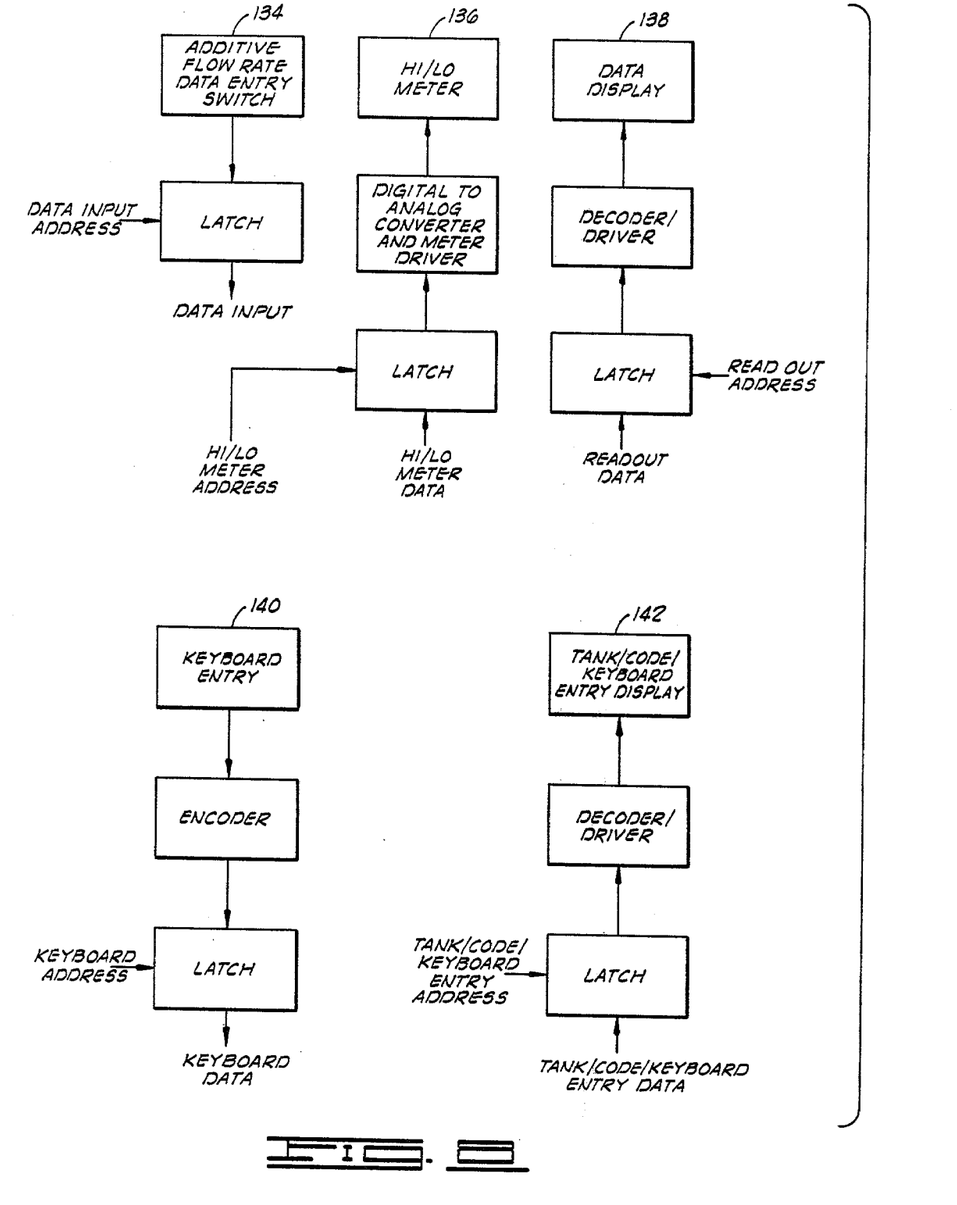
FIG. 8 is a functional block diagram depicting elements of the data input and data readout unit of the FIG. 2 embodiment.

With reference to both FIGS. 7 and 8, the elements of the data input and data readout unit 24 as shown on the panel 132 will be described. The panel 132 includes a plurality of thumbwheel switches 134 by which a first required additive flow rate may be entered. The entry is made by turning the thumbwheel switch of the respective additive channel with which it is associated to the appropriate rate setting and then having the entry latched into a latch under control of the central processing unit 32 via the address bus 36 and the data bus 38 as shown in FIG. 8. This first required flow rate is used by the central processing unit when it is in the LOCAL, or manual, mode as set by the mode switch 34.

FIG. 7 also shows that the panel includes a needle meter 136 in each channel for perceptibly displaying an error signal indicating whether the actual flow rate of the additive is above or below the desired flow rate. The meter 136 is controlled by the central processing unit sending a data control word to the latch shown in FIG. 8 to be associated with each meter and then latching the word therein for subsequent conversion by a digital-to-analog converter and display by the meter 136.

Each additive channel within the metering system also has a data display means 138, such as a liquid crystal display, as shown in FIG. 7. This displays pertinent channel information as provided by the central processing unit 32 over the data bus 38 and latched into a latch and decoded for driving the data display as shown in FIG. 8.

The panel 132 also includes a keyboard 140 for entering other data such as density and concentration levels. The keyboard entered data is displayed by a tank-/code/keyboard entry display means 142, such as a liquid crystal display. As an entry is made through the keyboard, the tank channel to which it is to be applied is displayed in the tank display, the code representing the nature of the entered data (such as whether the entry represents density or concentration) is displayed, and the actual data (e.g., density or concentration) itself is displayed. These panel elements are also controlled by the central processing unit 32 through the elements as shown in FIG. 8.

The panel 132 is further shown in FIG. 7 to include a main flowmeter input 144 for coupling with the output of the main flowmeter of the primary substance unit 6, a remote control input 146 for interfacing with a remote control unit, and channel feed on/off switches 148. The position of the channel feed on/off switches 148 determines whether the respective channels are in use and thus are to be monitored and controlled by the central processing unit 32 as subsequently described. Also shown on the panel 132 are the potentiometer 118 control knob and the thumbwheel switches for entering the calibration factor of the calibration means 126.

The keyboard 140 and the other data entry elements mentioned above provide means for varying the various reference levels which are used by the central processing unit 32 in metering the additives.

With reference to all the drawings in general, the operation of the present invention will be described. Initially, the data required for the central processing unit 32 to properly meter the additive of each channel within the system is entered through the channel thumbwheel switches 134 and the keyboard 140. The data entered into the channel thumbwheel switches establishes the desired rate that the additive is to be discharged from its metering container when the mode selection switch 34 is in either one of the local modes. The data entered through the keyboard 140 includes such parameters as the desired concentration of additive to be blended with the primary substance and the density of the dry additive contained in the dry additive containers. Also, the main flowmeter calibration factor is entered by appropriately setting the calibration thumbwheel switches 126, and the simulated main flowmeter flow rate is set by appropriately adjusting the potentiometer 118. Additionally, each of the switches 148 is placed in the feed position if the metering of that channel is to be controlled by the central processing unit 32. Further, the appropriate mode is selected via the mode switch 34.

Once the data is entered, the central processing unit 32 checks the status of the feed switches 148 and whether the desired concentration is entered for each channel. If the channel feed switch is on and the channel's desired concentration level entered, the central processing unit 32 meters the additive discharged from that channel. It is to be noted that this data can be changed, or newly entered for previously inactive channels, even after this initial entering and checking; however, the above-mentioned initial data entry and status checking functions are performed when the present invention commences its operation.

Having determined which channels are active, i.e., which channels have their switches 148 in the feed position and their concentrations entered, the central processing unit 32 determines whether it is to operate in the local mode or the blender FM mode by accessing the data as set by the mode switch 34. The central processing unit stores this information for later use. It is to be noted that metering control occurs only in either the local (manual) mode or blender FM (automatic) mode; no metering occurs if the mode switch is in either its off or standby positions because these are inactive or data entry only modes. When the local mode is selected, it can be chosen to use either the actual main flowmeter rate ("FM" position of switch 34) or the simulated flowmeter rate ("w/o FM" position of switch 34) in its controlling functions as more fully discussed below.

For each active liquid channel the central processing unit 32 performs the following functions. First, it accesses the data stored in the main flowmeter latch 130 to determine if the flow rate of the main flowmeter (actual flow rate if in local FM mode or simulated flow rate if in local w/o FM mode) is above a predetermined low level. Next, the central processing unit accesses the liquid tank flowmeter latch 112 to determine the actual flow rate of the additive being discharged from the respective additive container 104 of the particular channel. The central processing unit 32 then determines the required flow rate of the channel for the automatic (blender FM) mode, regardless of the mode switch 34 setting, based on the entered concentration level and the actual main flowmeter flow rate. The central processing unit also determines the required flow rate for the local mode based on the information entered in the respective channel thumbwheel switch 134.

Having determined the actual channel flow rate and the required channel flow rates, the central processing unit 32 calculates the error therebetween by subtracting the actual value from the required value. In other words, the controlling means 4 compares the actual value to a predetermined reference level, i.e., the calculated required value. If the central processing unit 32 has previously determined that it is in the blender FM mode (automatic mode), then the actual rate is subtracted from the required flow rate based on the concentration and actual main flowmeter rate. If the processing unit is in the local mode, it uses the required flow rate calculated on the basis of the setting of the channel thumbwheel switch 134. The calculated error, which may be positive or negative, is appropriately scaled and added to the currently stored metering control word, and the resultant corrected word is communicated to the liquid tank control latch 96. When this word is latched into the latch 96, the liquid tank flow actuator means 98 uses it to control the speed of the pump motor 100 thereby correcting the speed of the pump 102 to establish the desired flow rate. Particularly, in the preferred embodiment the latched information actuates the proportional control valve of the actuator means 98 to control the flow of hydraulic fluid to the hydraulic pump motor 100. In addition to being used to compute the correction word, the error value is output to the high/low meter latch, shown in FIG. 8, for conversion and driving of the channel high/low meter 136.

For each dry additive channel, the central processing unit 32 performs the following functions. First, it checks the inventory container, or bin, load cell latch 94 to determine the weight of the dry additive stored in the inventory bin 74.

This determination is based upon the previously entered density of the stored additive, the predetermined volume of the bin 74 and the predetermined weight of the container 74.

Next, the central processing unit 32 determines if the metering container 72 is being filled. If it is, the central processing unit 32 loops to the next channel to be monitored and metered. If the metering container 72 is not being filled, the central processing unit 32 calculates the required amounts of dry additive to be discharged for the automatic (blender FM) and manual (local) modes similar to the calculations performed for each of the active liquid additive channels. The processing unit then determines the actual weight change over a predetermined period of time of the dry additive stored in the dry additive metering container 72. This is done by reading the contents of the dry metering bin load cell latch 82 at a first time, waiting the predetermined period of time, again reading the latch 88 contents, subtracting the values of the two latch readings and then dividing by the predetermined time period.

Next, the central processing unit determines if it has a true material delivery by comparing each of two successive actual dry additive rates to a predetermined value. If the two rates are below the predetermined level, the central processing unit starts the motor 56 at its maximum speed for a short period of time, such as a fraction of a second. This drive speed control is effected by outputting the appropriate command word to the drive metering bin control latch 52. At the expiration of the short period of time, the drive is reduced and the central processing unit proceeds to its next operation.

This next operation is to calculate the error between the required and actual rates similar to that done for the liquid additive channel. This dry additive error signal is appropriately scaled and used similarly to the liquid additive error signal to establish a corrected metering control word which is output to the dry metering bin control latch 52 for adjusting the speed of the motor 56 and the screw conveyor 58 driven thereby. The dry additive error signal is also used to drive the respective high/low meter 136.

After the central processing unit 32 has adjusted the metering speeds of each of the liquid and dry channels as above described, the central processing unit 32 checks the metering container 72 of each active dry additive channel to see if it needs to be filled. The central processing unit 32 initially computes the actual weight of the additive within the metering container 72. As mentioned above with respect to the monitoring of the contents of the inventory container 74, the weight of the additive in the metering container 72 is determined by utilizing the previously entered density of the dry additive, the predetermined volume of the metering container 72, and the predetermined weight of the container 72. If the metering bin has been filling for a predetermined time, the central processing unit 32 detects this and shuts-off the inventory bin control valve 70 by outputting the appropriate command through the inventory bin valve switching means 41. If the bin has not been filling for this predetermined time, the processing unit 32 compares the computed actual additive weight with a predetermined high limit value. If the actual weight exceeds the high limit value, the control valve 70 is shut-off. The central processing unit 32 then compares the actual weight with a predetermined low limit.

If the actual weight is below the low limit, the control valve 70 is opened by means of a signal from the valve switching means 41 to release the dry additive from the inventory container 74 and thereby fill the metering container 72. Through this operation the central processing unit determines, during its metering of the dry additive channels, whether the metering bins, or containers, 72 are being filled. In the preferred embodiment, the high limit value is set at a weight which indicates that the metering container 72 is three-fourths full and the low limit value is set at a weight which indicates that the metering bin 72 is one-fourth full.

It is to be noted that the above computations, such as the subtracting of actual values from required values, are made on the basis of normalized values, i.e., values which are in the same units. For example, the actual and required liquid additive flow rates may be normalized to have units of gallons per minute or the like. This normalization may be done by, for example, scaling the digitally-coded signals processed by the central processing unit.

Figure 9A:
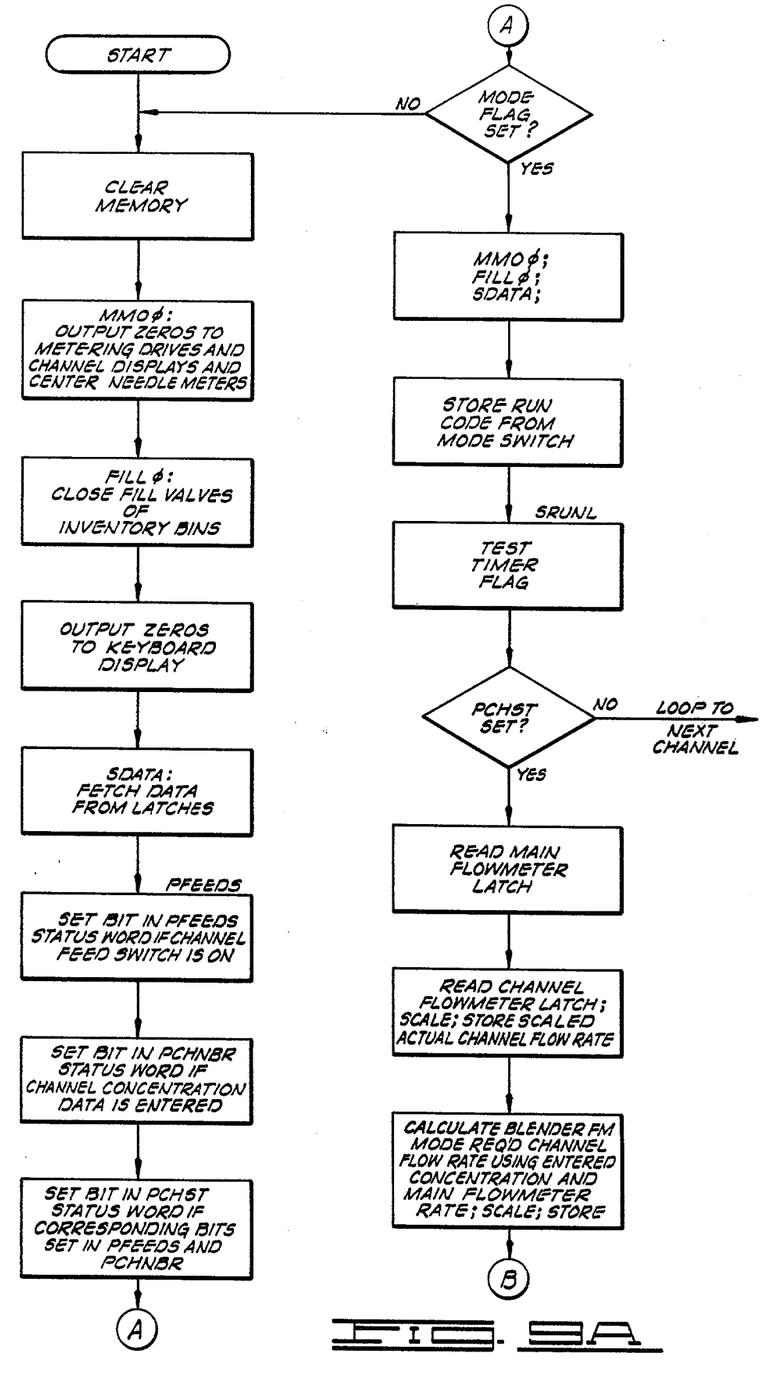
FIGS. 9A–9C are a flow chart of the computer program of the present invention.
Figure 9B:
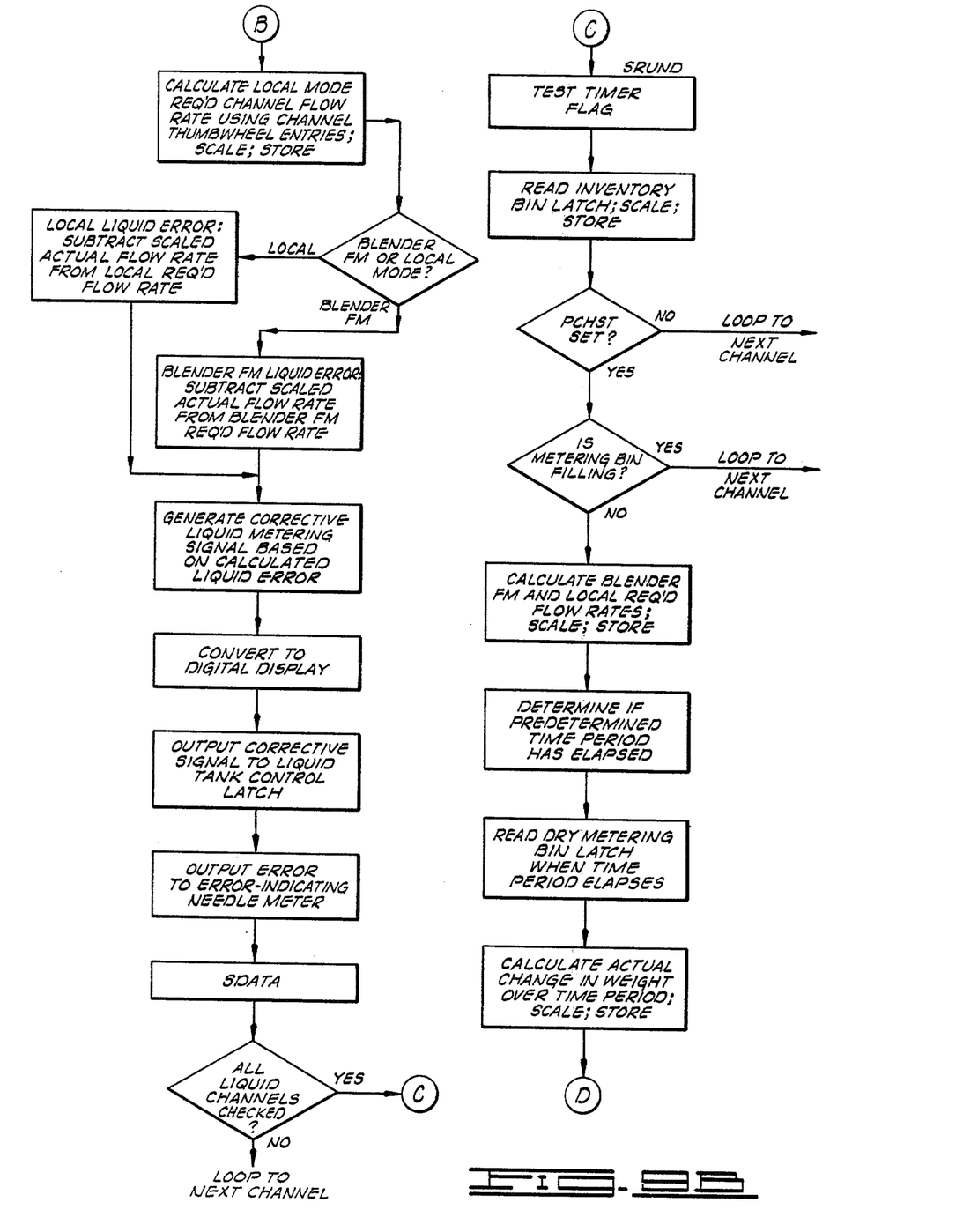
Figure 9C:
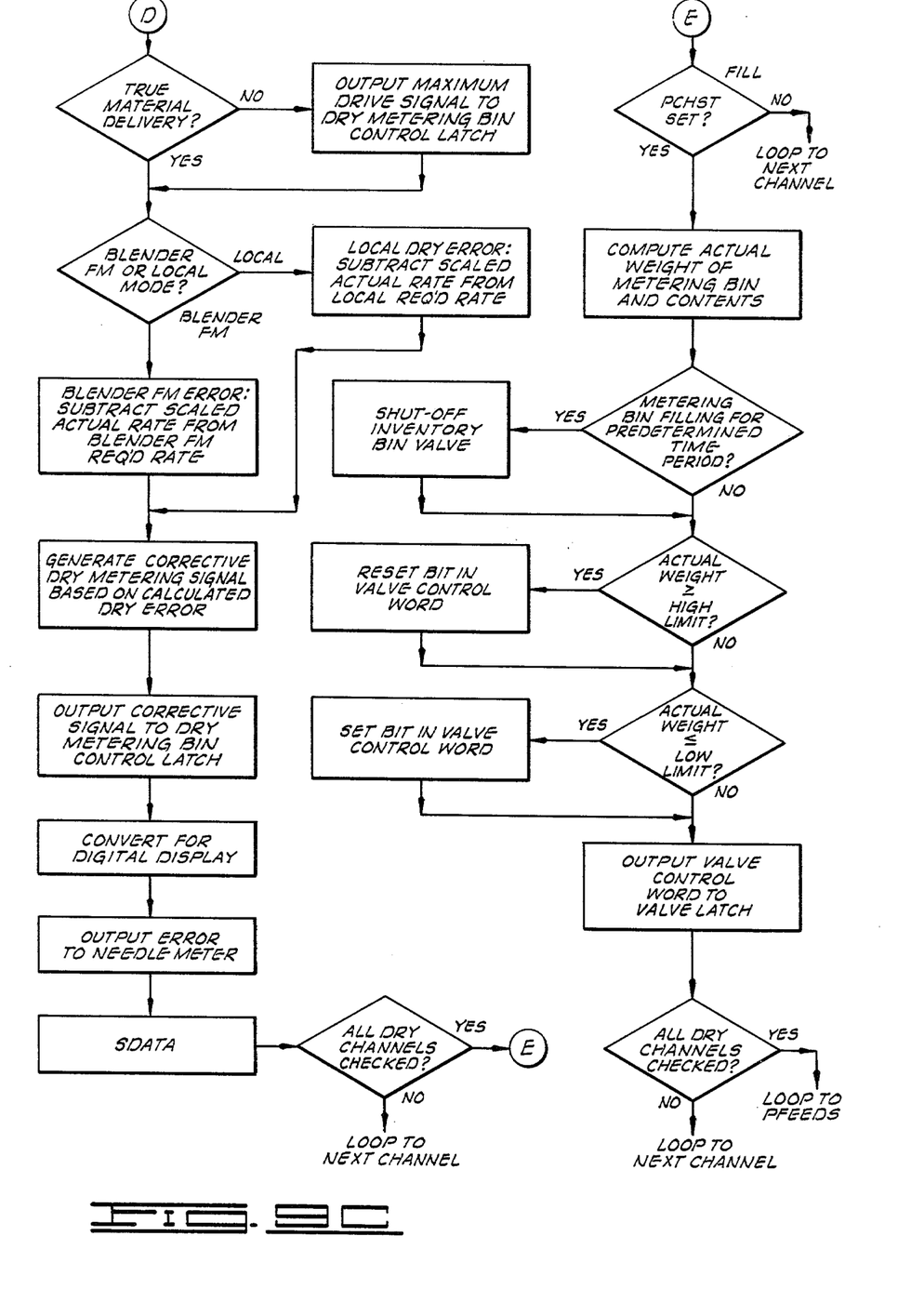

These operations are carried out under the direction of a program stored in the memory 46. A flow chart of this program is shown in FIGS. 9A-9C. Through the interaction of the microprocessor, memory and the program stored therein, which elements form a part of the central processing unit 32, it is apparent that the present invention includes the various means for performing the above-described functions.

From the foregoing it is apparent that the present invention utilizes both the actual amounts of additive discharged (e.g., the liquid additive flow rates and the dry additive weights) and the amount of primary substance discharged (e.g., the actual flow rate of the primary substance or the simulated flow rate), as well as the concentration, density and desired flow rate values entered through the data input and data readout display panel 132, to achieve continuous automatic metering of both liquid and dry additives. Thus, the present invention for continuously automatically metering additives to be added to a primary substance is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An additive metering control system comprising:
   means for determining the amount of an additive being discharged from an additive container;
   means for sensing the amount of a primary substance being discharged from a primary substance container;
   means, responsive to said additive determining means and said primary substance sensing means, for controlling the amount of the additive being discharged from the additive substance container; and
   said primary substance sensing means including:
   means for generating a first electrical signal proportional to the flow rate of the sensed primary substance;
   means for simulating a flow rate of the primary substance and for generating a second electrical signal proportional to the simulated flow rate; and means for switchably communicating said first electrical signal generating means and said simulating and generating means with said controlling means.

2. The system as defined in claim 1 wherein said additive determining means includes means for monitoring the volumetric flow rate of the additive substance and for generating a third electrical signal proportional to the monitored flow rate.

3. The system as defined in claim 2 wherein said additive determining means further includes:
means for converting the third electrical signal into a digitally-coded format; and
means for retaining the digitally-coded signal for acquisition by said controlling means.

4. The system as recited in claim 3, wherein said controlling means includes:
means for calculating a required amount of the additive to be discharged from the additive container;
means for retrieving and scaling the digitally-coded signal retained in said retaining means;
means for subtracting the scaled, digitally-coded signal from the required amount of the additive to be discharged; and
means, responsive to said subtracting means, for correcting the amount of additive discharged from the additive container.

5. The system as defined in claim 1 wherein said additive determining means includes means for detecting the weight of a first portion of the additive and for generating a third electrical signal proportional to the detected weight.

6. The system as defined in claim 5 wherein said additive determining means further includes means for sensing the weight of a second portion of the additive and for generating a fourth electrical signal proportional to the sensed weight.

7. The system as defined in claim 6 wherein said additive determining means further includes means for filtering the third electrical signal.

8. The system as defined in claim 7 wherein said additive determining means further includes:
means for converting the filtered third electrical signal into a digitally-coded format; and
means for retaining the digitally-coded signal for acquisition by said controlling means.

9. The system as defined in claim 5 wherein said additive determining means further includes means for filtering the third electrical signal.

10. The system as defined in claim 9 wherein said additive determining means further includes:
means for converting the filtered third electrical signal into a digitally-coded format; and
means for retaining the digitally-coded signal for acquisition by said controlling means.

11. The system as recited in claim 10, wherein said controlling means includes:
means for calculating a required amount of the additive to be discharged from the additive container;
means for retrieving the digitally-coded signal retained by said retaining means at a first time and for retrieving the digitally-coded signal retained by said retaining means at a second time;
means, responsive to said retrieving means, for computing the amount of additive discharged from the additive container between said first time and said second time;
means for subtracting the amount of additive discharged from the additive container from the calculated required amount to be discharged; and
means, responsive to said subtracting means, for correcting the amount of additive discharged from the additive container.

12. The system as defined in claim 1 wherein said controlling means includes:
means for comparing the amount of discharged additive with a predetermined reference value; and
means, responsive to said comparing means, for creating an error signal when the discharged amounts do not favorably compare with the predetermined reference value.

13. The system as defined in claim 12 wherein said controlling means further includes:
means for varying the predetermined reference level; and
means for displaying the error signal in a perceptible format.

14. The system as defined in claim 12 wherein said controlling means further includes means for using the error signal to provide a correction signal so that the amount of additive discharged from the additive container is thereby controlled.

15. A control system for metering the amount of a dry additive discharged from a dry additive metering container, which metering container is associated with a dry additive inventory container, and for metering the amount of a liquid additive discharged from a liquid additive container, which discharged amounts are for mixing with a primary substance discharged from a primary substance container, said system comprising:
means for determining the amount of the dry additive being discharged from the dry additive metering container;
means for determining the amount of the liquid additive being discharged from the liquid additive container;
means for sensing the amount of the primary substance being discharged from the primary substance container;
means, responsive to said dry additive determining means, said liquid additive determining means, and said primary substance sensing means, for controlling the amount of the dry additive being discharged from the dry additive metering container and for controlling the amount of the liquid additive being discharged from the liquid additive container; and
said means for sensing the amount of the primary substance including:
means for generating a first voltage level proportional to the flow rate of the sensed primary substance;
means for simulating a flow rate of the primary substance by generating a second voltage level representing the simulated flow rate; and
means for switchably communicating said first voltage generating means and said simulating means with said controlling means.

16. The system as defined in claim 15 wherein said dry additive determining means includes:
hydraulic load cell means associated with the dry additive metering container for detecting the weight of the metering container and the dry additive contained therein and for generating a first electrical signal proportional to the detected weight;

electronic filter means for filtering a predetermined range of frequencies from the first electrical signal;

means for converting the filtered first electrical signal into a digitally-coded format; and first memory means for storing the digitally-coded first electrical signal for acquisition by said controlling means.

17. The system as defined in claim 16 wherein said dry additive determining means further includes:

means for sensing the weight of the dry additive inventory container and the dry additive contained therein and for generating a second electrical signal proportional to the sensed weight;

means for converting the second electrical signal into a digitally-coded format; and second memory means for storing the digitally-coded second electrical signal for acquisition by said controlling means.

18. The system as defined in claim 17 wherein said liquid additive determining means includes:

flowmeter means for monitoring the flow rate of the liquid additive being discharged and for generating a third electrical signal proportional to the monitored rate;

means for converting the third electrical signal into a digitally-coded format; and third memory means for storing the digitally-coded third electrical signal for acquisition by said controlling means.

19. The system as defined in claim 18 wherein said primary substance sensing means includes:

means for generating a fourth electrical signal proportional to the flow rate of the sensed primary substance;

means for converting the fourth electrical signal into a digitally-coded format; and fourth memory means for storing the digitally-coded fourth electrical signal for acquisition by said controlling means.

20. The system as defined in claim 19, wherein said controlling means includes:

means for accessing and acquiring the respectively stored, digitally-coded first, second, third and fourth electrical signals from the respective memory means;

first calculating means for calculating the required amount of dry additive to be discharged based on the digitally-coded fourth electrical signal;

first comparing means for comparing the digitally-coded first electrical signal with the calculated required amount of dry additive;

first correcting means responsive to said first comparing means for providing a first correcting signal to a dry additive discharging means to control the amount of dry additive discharged from the dry additive metering container;

second comparing means for comparing the digitally-coded second electrical signal to a predetermined reference value;

means, responsive to said second comparing means, for sending an actuating signal to a dry additive releasing means to control the release of the dry additive from the dry additive inventory container into the dry additive metering container;

second calculating means for calculating the required amount of liquid additive to be discharged based on the fourth electrical signal;

third comparing means for comparing the digitally-coded third electrical signal with the calculated required amount of liquid additive; and second correcting means, responsive to said third comparing means, for providing a second correction signal to a liquid additive discharging means to control the amount of liquid additive discharged from the liquid additive container.

21. The system as defined in claim 18 wherein said switchably communicating means includes:

means for converting a voltage level into an alternating electrical signal having a frequency corresponding to the input voltage level;

switch means for selectably coupling said first voltage level generating means and said simulating means to said converting means;

means for calibrating the frequency of the alternating electrical signal output from said converting means; and fourth memory means for storing the calibrated electrical signal for acquisition by said controlling means.

22. The system as defined in claim 21 wherein said controlling means includes:

means for accessing and acquiring the respective digitally-coded first, second, and third electrical signals and the selectably coupled one of the first and second voltage levels from the respective memory means;

first calculating means for calculating the required amount of dry additive to be discharged based on the selectably coupled one of the first and second voltage levels;

first comparing means for comparing the digitally-coded first electrical signal with the calculated required amount of dry additive;

first correcting means responsive to said first comparing means for providing a first correcting signal to a dry additive discharging means to thereby control the amount of dry additive discharged from the dry additive metering container;

second comparing means for comparing the digitally-coded second electrical signal to a predetermined reference value;

means, responsive to said second comparing means, for sending an actuating signal to a dry additive releasing means to thereby control the release of the dry additive from the dry additive inventory container into the dry additive metering container;

second calculating means for calculating the required amount of liquid additive to be discharged based on the selectably coupled one of the first and second voltage levels;

third comparing means for comparing the digitally-coded third electrical signal with the calculated required amount of liquid additive; and second correcting means, responsive to said third comparing means, for providing a second correction signal to a liquid additive discharging means to thereby control the amount of liquid additive discharged from the liquid additive container.

23. The system as defined in claim 15 wherein said switchably communicating means includes:

means for converting a voltage level into an alternating electrical signal having a frequency corresponding to the input voltage level;

switch means for selectably coupling said first voltage level generating means and said simulating means to said converting means; and means for calibrating the frequency of the alternating electrical signal output from said converting means.

24. The system as recited in claim 15 wherein said controlling means includes:

means for indicating when the amount of dry additive being delivered from the dry additive metering container by a discharging means is below a predetermined level; and means, responsive to said dry additive delivery indicating means, for causing said discharging means to operate at a maximum speed for a predetermined period of time.

25. A method of metering additives to be blended with a primary substance in a system having a dry additive stored in a dry additive inventory container associated with a dry additive metering container and also having a liquid additive stored in a liquid additive container, said method comprising the steps of:

receiving data pertaining to concentrations of the dry additive and the liquid additive to be obtained in the blending thereof with the primary substance, to density of the dry additive, and to first required flow rates of the dry additive and the liquid additive;

determining if said method is to be performed in an automatic mode or a manual mode;

testing the flow rate of the primary substance;

monitoring the actual flow rate of the liquid additive as it is discharged from the liquid additive container;

calculating a second required liquid additive flow rate using the concentration data and the flow rate of the primary substance;

normalizing the actual and the first and second required liquid additive flow rates;

subtracting the normalized actual liquid additive flow rate from the normalized second required liquid additive flow rate when the method is performed in the automatic mode;

subtracting the normalized actual liquid additive flow rate from the normalized first required liquid additive flow rate when the method is performed in the manual mode;

generating a liquid additive error signal from the result of the operative one of said subtracting steps;

controlling the discharge rate of the liquid additive in response to the liquid additive error signal;

evaluating the weight of the dry additive stored in the dry additive inventory container;

determining if the dry additive metering container is being filled with the dry additive;

calculating a second required dry additive discharge rate using the concentration data and the flow rate of the primary substance;

computing the change in weight of the dry additive in the dry additive metering container over a predetermined period of time to thereby obtain an actual dry additive discharge rate;

normalizing the actual and the first and second required dry additive discharge rates;

subtracting the normalized actual dry additive discharge rate from the normalized second required dry additive discharge rate when the method is performed in the automatic mode;

subtracting the normalized actual dry additive discharge rate from the normalized first required dry additive discharge rate when the method is performed in the manual mode;

generating a dry additive error signal from the results of the operative one of said subtracting steps; and controlling the dry additive discharge rate in response to the dry additive error signal.

26. A method as recited in claim 25, further comprising the steps of:

indicating when the amount of dry additive being delivered from the dry additive metering container by a means for discharging the additive therefrom is below a predetermined level; and controlling the discharge means so that it is driven at a maximum speed for a predetermined period of time in response to said indicating step indicating the amount of dry additive being delivered is below the predetermined level.

27. A method as recited in claim 26, further comprising the step of:

activating a means for filling the dry additive metering container with additive from the dry additive inventory container when the amount of additive in the dry additive metering container is below a predetermined level.

28. An additive metering control system, comprising:

an additive container;

means for causing mechanical vibrations in said additive container;

additive determining means for determining the amount of an additive being discharged from said additive container, said additive determining means including:

means for detecting the weight of the additive and the mechanical vibrations and for generating an electrical signal proportional to the detected weight, said electrical signal having a frequency component within a predetermined range of frequencies in response to the detected mechanical vibrations; and filter means for removing from said electrical signal said frequency component created by the detected mechanical vibrations;

primary substance sensing means for sensing the amount of a primary substance being discharged from a primary substance container; and means, responsive to said additive determining means and said primary substance sensing means, for controlling the amount of additive being discharged from said additive container.

29. The system as defined in claim 28, wherein:

said additive determining means further includes:

means for converting the filtered electrical signal into a digitally-coded format; and means for retaining the digitally-coded signal for acquisition by said controlling means; and said controlling means includes:

means for calculating a required amount of the additive to be discharged from the additive container;

means for retrieving the digitally-coded signal retained by said retaining means at a first time and for retrieving the digitally-coded signal retained by said retaining means at a second time;

means, responsive to said retrieving means, for computing the amount of additive discharged from the additive container between said first time and said second time;

means for subtracting the amount of additive discharged from the additive container from the calculated required amount to be discharged; and means, responsive to said subtracting means, for correcting the amount of additive discharged from the additive container.

30. A control system for metering the amount of a dry additive discharged from a dry additive metering container, which dry additive metering container is associated with a dry additive inventory container, and for metering the amount of a liquid additive discharged from a liquid additive container, which discharged amounts are for mixing with a primary substance discharged from a primary substance container, said system comprising:

means for determining the amount of the dry additive being discharged from the dry additive metering container, said means including:

hydraulic load cell means associated with the dry additive metering container for detecting the weight of the metering container and the dry additive contained therein and for generating a first electrical signal proportional to the detected weight;

electronic filter means for filtering a predetermined range of frequencies from the first electrical signal;

means for converting the filtered first electrical signal into a digitally-coded format; and first memory means for storing the digitally-coded first electrical signal;

means for determining the amount of liquid additive being discharged from the liquid additive container;

means for sensing the amount of the primary substance being discharged from the primary substance container; and means, responsive to said digitally-coded first electrical signal, said liquid additive determining means, and said primary substance sensing means, for controlling the amount of the dry additive being discharged from the dry additive metering container and for controlling the amount of the liquid additive being discharged from the liquid additive container.

31. The system as defined in claim 30, wherein:
said dry additive determining means further includes:
means for sensing the weight of the dry additive inventory container and the dry additive contained therein and for generating a second electrical signal proportional to the sensed weight;

means for converting the second electrical signal into a digitally-coded format; and second memory means for storing the digitally-coded second electrical signal for acquisition by said controlling means;

said liquid additive determining means includes:
flowmeter means for monitoring the flow rate of the liquid additive being discharged and for generating a third electrical signal proportional to the monitored rate;

means for converting the third electrical signal into a digitally-coded format; and third memory means for storing the digitally-coded third electrical signal for acquisition by said controlling means;

said primary substance sensing means includes:
means for generating a fourth electrical signal proportional to the flow rate of the sensed primary substance;

means for converting the fourth electrical signal into a digitally-coded format; and fourth memory means for storing the digitally-coded fourth electrical signal for acquisition by said controlling means; and said controlling means includes:
means for accessing and acquiring the respectively stored digitally-coded first, second, third and fourth electrical signals from the respective memory means;

first calculating means for calculating the required amount of dry additive to be discharged based on the digitally-coded fourth electrical signal;

first comparing means for comparing the digitally-coded first electrical signal with the calculated required amount of dry additive;

first correcting means responsive to said first comparing means for providing a first correcting signal to a dry additive discharging means to control the amount of dry additive discharged from the dry additive metering container;

second comparing means for comparing the digitally-coded second electrical signal to a predetermined reference value;

means, responsive to said second comparing means, for sending an actuating signal to a dry additive releasing means to control the release of the dry additive from the dry additive inventory container into the dry additive metering container;

second calculating means for calculating the required amount of liquid additive to be discharged based on the fourth electrical signal;

third comparing means for comparing the digitally-coded third electrical signal with the calculated required amount of liquid additive; and second correcting means, responsive to said third comparing means, for providing a second correcting signal to a liquid additive discharging means to control the amount of liquid additive discharged from the liquid additive container.

32. A metering control system for controlling the amount of a liquid additive discharged from a liquid additive container into a primary substance, comprising:

means for determining the amount of the liquid additive being discharged from the liquid additive container, said liquid additive determining means including:

means for monitoring the actual flow rate of the additive and for generating an electrical signal proportional to the monitored actual flow rate;

means for converting the electrical signal into a digitally-coded format; and means for electronically retaining the digitally-coded signal;

means for sensing the amount of the primary substance being discharged from a primary substance container; and means, responsive to the digitally-coded signal in said electronic retaining means and to said primary substance sensing means, for controlling the amount of the liquid additive being discharged from the liquid additive container, said controlling means including:
  central processing means for generating liquid container control data;
  means for discharging the liquid additive from the liquid additive container; and
  data bus means connecting said central processing means to said discharging means so that said liquid container control data can be transmitted to said discharging means.

33. The system as defined in claim 32, wherein said discharging means includes:
  latch means for storing the liquid container control data transmitted over said data bus means;
  pump means for pumping the liquid additive from the liquid additive container;
  pump drive means for driving said pump means; and
  liquid container flow actuator means, responsive to the liquid container control data stored in said latch means, for controlling said pump drive means.

34. The system as defined in claim 33, wherein:
said controlling means further includes:
  means for entering a first required liquid additive flow rate;
  means for entering a desired concentration level of the liquid additive; and
  mode selection means for selecting one of a first mode of operation of said system and a second mode of operation of said system; and
said central processing means includes:
  means for determining a second required liquid additive flow rate based on the entered concentration level and on the actual flow rate of the primary substance sensed by said primary substance sensing means;
  means, responsive to said mode selection means, for determining the error between the actual flow rate of the liquid additive being discharged from the liquid container and the first required flow rate when said mode selection means selects said first mode of operation and for determining the error between the actual flow rate of the liquid additive being discharged from the liquid container and the second required flow rate when said mode selection means selects said second mode of operation; and
  means for communicating the error to said latch means.

35. The system as defined in claim 34, wherein:
said means for entering a first required liquid additive flow rate includes first switch means connected to said data bus means; and
said means for entering a desired concentration level of the liquid additive includes second switch means connected to said data bus means.

36. The system as defined in claim 32, wherein:
said controlling means further includes:
  means for entering a first required liquid additive flow rate;
  means for entering a desired concentration level of the liquid additive; and
  mode selection means for selecting one of a first mode of operation of said system and a second mode of operation of said system; and
said central processing means includes:
  means for determining a second required liquid additive flow rate based on the entered concentration level and on the actual flow rate of the primary substance sensed by said primary substance sensing means;
  means, responsive to said mode selection means, for determining the error between the actual flow rate of the liquid additive being discharged from the liquid container and the first required flow rate when said mode selection means selects said first mode of operation and for determining the error between the actual flow rate of the liquid additive being discharged from the liquid container and the second required flow rate when said mode selection means selects said second mode of operation; and
  means for communicating the error to said latch means.

37. The system as defined in claim 36, wherein:
said means for entering a first required liquid additive flow rate includes first switch means connected to said data bus means; and
said means for entering a desired concentration level of the liquid additive includes second switch means connected to said data bus means.

* * * * *